UNITED STATES PATENT OFFICE.

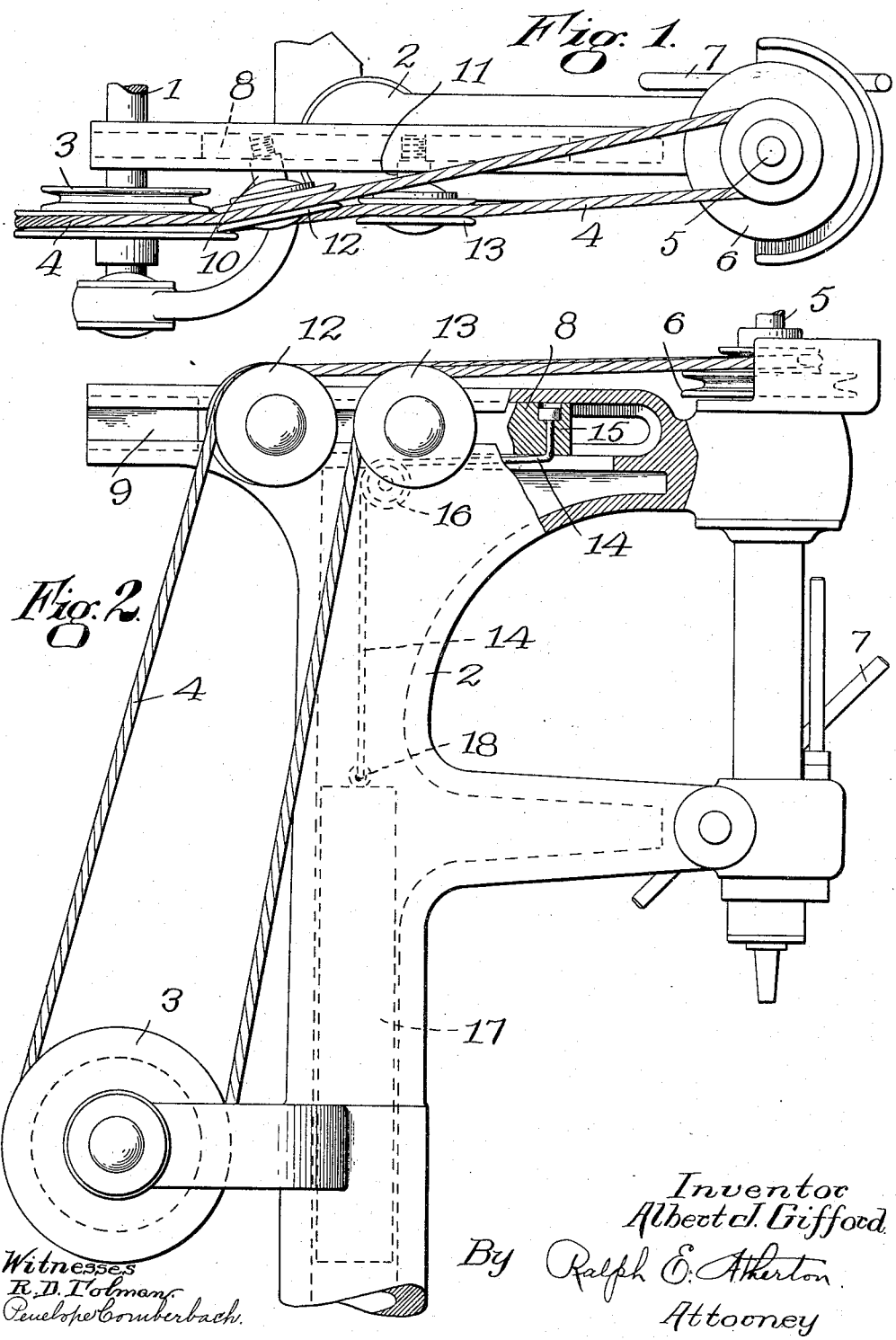

ALBERT J. GIFFORD, OF WORCESTER, MASSACHUSETTS.

BELT-TIGHTENING DEVICE.

1,202,054. Specification of Letters Patent. Patented Oct. 24, 1916.

Application filed April 7, 1913. Serial No. 759,577.

*To all whom it may concern:*

Be it known that I, ALBERT J. GIFFORD, a citizen of the United States, residing at Worcester, in the county of Worcester and Commonwealth of Massachusetts, have invented a new and useful Improvement in Belt-Tightening Devices, of which the following, together with the accompanying drawing, is a specification.

My invention relates to drilling machines and more particularly to that class of drilling machines in which a driving shaft operates a driven shaft or spindle by means of a suitable belt connection.

One object of the invention is to provide an improved form of mechanism for insuring proper and uniform tension at all times in the belt of a machine of the type referred to.

Another object of the invention is to provide an extremely simple form of such belt tensioning mechanism which shall be capable of performing its function properly even though there be wide variations in the length of the belt.

Further objects and advantages will appear from the following description taken in connection with the accompanying drawing, in which—

Figure 1 is a plan view of a sufficient portion of an ordinary drilling machine to illustrate the principles of my invention, and Fig. 2 is a side view of the same machine, a part being shown in section to reveal details of construction.

Like reference characters refer to similar parts in both figures.

In the form of machine shown in the drawing the driving shaft 1, supported in suitable bearings by the frame 2 of the machine, may be driven in any desired manner as by a belt and pulley. Mounted on the driving shaft 1 is a stepped or cone pulley 3 upon which runs the belt 4 which, in turn, drives the tool carrying shaft or spindle 5 through a second stepped or cone pulley 6. The spindle 5 is driven by the cone 6 through a spline connection so that the spindle 5 together with the tool carried thereby may be raised and lowered by the lever 7 in any desired manner, as by a rack and pinion connection, without changing the position of the pulley 6.

The slide 8 is movable longitudinally in the guideway 9 formed in the upper portion of the framework of the machine and carries two studs 10 and 11 screwed firmly into suitable threaded openings in the slide. Upon the outer ends of these studs are mounted the two pulleys 12 and 13, the positions of these two pulleys being such that they will carry properly the two sides of the belt 4 as shown clearly in the drawing. The direction of the guideway 9 and, therefore, the movements of the pulley supporting slide 8 therein are parallel or nearly so to the planes in which the pulleys 3 and 6 rotate. It is obvious, therefore, that any reasonable amount of motion of the slide 8 will not carry the pulleys 12 and 13 out of proper operative relation with the driving pulley 3 and the driven pulley 6. It is clear too that any motion of the slide 8 toward the rear of the machine will carry the pulleys 12 and 13 more tightly against the belt 4 so as to increase the tension of the belt, while motion of the slide 8 in the opposite direction would have the effect of loosening the belt. A cord 14, or any equivalent flexible connector, is attached at one end to the forward end 15 of the slide 8 and passes from its point of attachment rearwardly toward the other end of the slide, thence over an idle pulley 16 to support the weight 17 to which it is attached in any suitable manner, as by tying it to an eye 18 secured to the upper end of the weight 17. For the purpose of providing protection to the parts as well as to give a neat appearance to the finished machine, the weight 17 with its supporting cord 14 and pulley 16 are inclosed within the hollow interior of the frame 2 of the machine.

The weight 17 acting through the cord 14 tends to draw the slide 8 toward the rear of the machine so as to keep the pulleys 12 and 13 pressed constantly against the belt 4 so as to cause a tension in the belt dependent upon the downward force of the weight 17. By changing the weight 17, therefore, the tension in the belt 4 may be varied as desired. It is clear too that when the proper weight has been attached to the cord 14 to give the desired tension in the belt 4, the tension will remain substantially constant so long as the weight is unchanged even though the belt may stretch considerably, or even though it be replaced by another belt of different length. A further important advantage is that the belt may be changed from one to another step on either of the pulleys 3 and 6 with no practical change in its tension, the weight 17 continuing to cause the pulleys 12 and 13 to press against the two sides of the belt with practically the same force as before the change. While, of course, the movements of the pulleys 12 and 13 change the relative angles between the two portions of each side of the belt so as to cause slight changes theoretically in the belt tension even with the same weight suspended by the cord 14, such changes are, of course, practically negligible.

In machines of this class it has previously been the practice to use the ordinary form of flat belt in place of the round belt 4 shown in the drawing. There are many advantages, however, in using the round belt and in providing grooved pulleys for it to run upon. When a flat belt is used, the stepped pulley 3 must be made adjustable upon the driving shaft 1 in order that the desired step of this pulley may be properly positioned with respect to the pulleys 12 and 13. It has also been customary to provide some means whereby the guideway 9 may be vertically adjusted so as to bring the pulleys 12 and 13 into proper position with relation to the step of the pulley 6 upon which the belt is to run. As the result of the use of a round belt and grooved pulleys, it will be seen that these adjustments are unnecessary and, therefore, that the construction of the machine is much simplified. The pulley 3 may be fixed longitudinally of its shaft 1 and no adjustment of the slide 8 is necessary transversely of its guideway 9.

It will be apparent that the disposition of the two guide pulleys 12 and 13 in a common horizontal plane tends to the production of equal tensions in the two sides of the moving belt 4. Obviously, if one of said pulleys were disposed with its axis above or below the line of movement of the slide 8, a difference would exist between the effects of the two pulleys on the belt.

Having shown and described one form of my invention, what I claim as new and desire to secure by Letters Patent is:

1. In a machine of the class described, a driving shaft and a driven shaft, adjacent sheaves of different diameters on each shaft, the axes of said shafts being substantially at right angles and in different planes, an endless belt adapted to drive between either sheave on the driving shaft and either sheave on the driven shaft, a belt tightening device constrained to slide in a direction substantially at right angles to the axes of both shafts, and comprising a pair of guide sheaves, one for each side of said belt, and a weight attached to said device and hanging by gravity therefrom, to exert a constant force tending to hold said guide sheaves against said belt, whereby said belt is automatically kept under the same tension, irrespective of which sheaves on the driving and driven shafts it connects.

2. In a machine of the class described, a driving shaft and a driven shaft, adjacent sheaves of different diameters on each shaft, the axes of said shafts being substantially at right angles and in different planes, an endless belt adapted to drive between either sheave on the driving shaft and either sheave on the driven shaft, a belt tightening device constrained to slide in a direction substantially at right angles to the axes of both shafts, and comprising a pair of guide sheaves, one for each side of said belt, with the axis of one guide sheave oblique, and a weight attached to said device and hanging by gravity therefrom, to exert a constant force tending to hold said guide sheaves against said belt, whereby said belt is automatically kept under the same tension, irrespective of which sheaves on the driving and driven shafts it connects.

ALBERT J. GIFFORD.

Witnesses:
PENELOPE COMBERBACH,
NELLIE WHALEN.

Copies of this patent may be obtained for five cents each, by addressing the "Commissioner of Patents, Washington, D. C."